Jan. 3, 1928.

L. DINESEN 1,654,795

MILKING APPARATUS

Filed Dec. 30, 1924

Inventor
Laurits Dinesen
By his Attorneys

Jan. 3, 1928. 1,654,795
L. DINESEN
MILKING APPARATUS
Filed Dec. 30, 1924 2 Sheets-Sheet 2
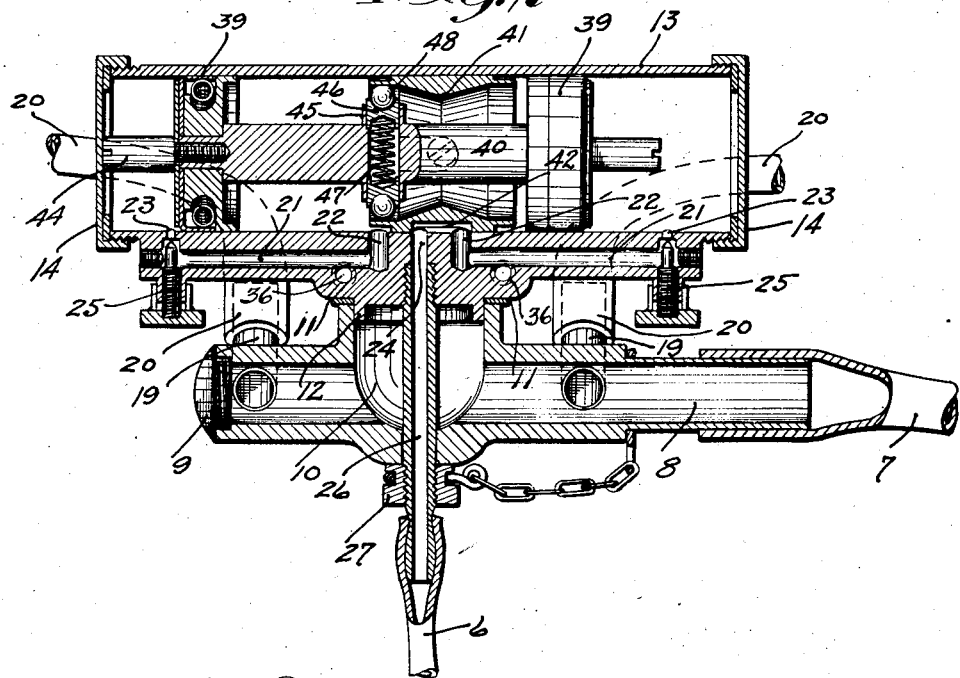
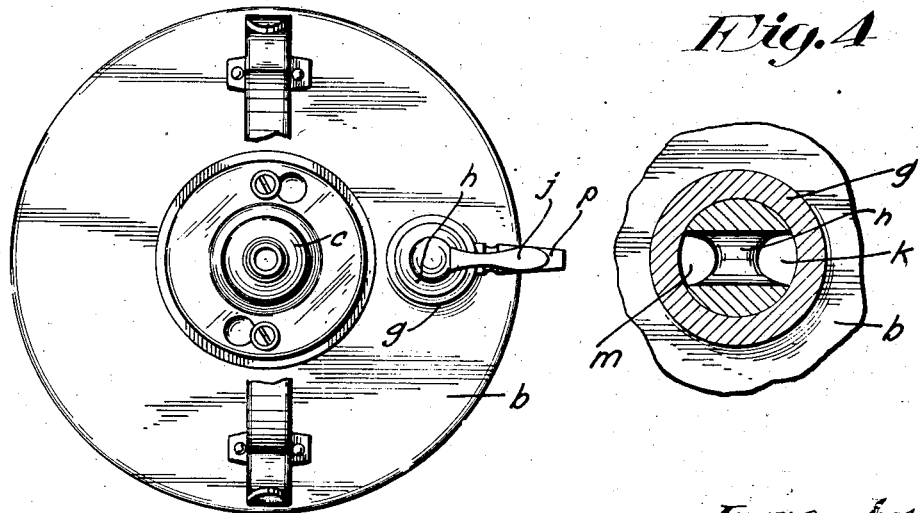
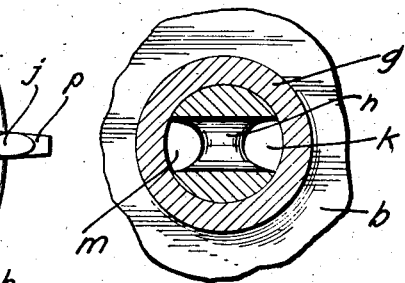
Inventor
Laurits Dinesen
By his Attorneys Patented Jan. 3, 1928.

1,654,795

UNITED STATES PATENT OFFICE.

LAURITS DINESEN, OF MINNEAPOLIS, MINNESOTA.

MILKING APPARATUS.

Application filed December 30, 1924. Serial No. 758,830.

My invention has for its particular object to improve that type of milking apparatus wherein partial vacuum is maintained in a milk can and the milk can is connected to a coupling tube and pulsator by two flexible tubes, the one serving to conduct the milk from the coupling tube to the can and the other to draw air from the pulsator mechanism into the can in the operation of the pulsator; and, generally stated, the invention consists of the novel devices and combinations of devices hereinafter described and defined in the claims.

At this time, it is thought advisable only to state in a general way that the invention is directed to simple means whereby, when the milk is flowing freely from the cow, the pulsator will produce relatively long and strong pulsating actions and when the milk ceases to flow freely, the pulsator will produce relatively short, rapid and less intense pulsating actions, such as desirable to complete the milking operation and which operation is generally known as "stripping".

The present invention is applicable generally to milking systems of the character above indicated, but for clearness and completeness of disclosure, I have, in the accompanying drawings, illustrated the same as applied to a pulsator mechanism of the character disclosed and claimed in my prior Patent #1,521,606, of date January 6, 1925, entitled "Milking apparatus". The present seems to be an invention the broad features of which may be more readily disclosed after first having considered the development of the invention and the application thereof to the pulsator mechanism of my prior application in a manner that serves to convert the milking apparatus of said prior application into a "two-line" milking apparatus.

The invention applied as just above indicated is illustrated in the accompanying drawings, wherein like characters indicate like parts throughout the several views.

Referring to the drawings:

Fig. 1 is a view partly in elevation and partly in vertical section, some parts being broken away, illustrating my invention as applied to milking apparatus;

Fig. 2 is a vertical section taken axially through the pulsator and connected coupling tube;

Fig. 3 is a plan view of the milk pail or receptacle and immediately connected parts, some portions being broken away;

Fig. 4 is a fragmentary enlarged horizontal section taken on the line 4—4 of Fig. 1; and Fig. 5 is a vertical section illustrating a modified form of the combined milk and air trap.

The preferred embodiment of the invention is illustrated in Figs. 1, 2, 3, and 4, and referring to these views, the character $a$ indicates the milk pail or recetacle provided with an air-tight cover $b$ equipped with a nipple $c$ in which is enclosed a check valve $d$ that normally closes an air discharge port $e$. The nipple $c$ is connected by a flexible tube $f$ and other connections, not shown, to a vacuum tank or other means for producing and maintaining a partial vacuum in the milk can $a$. The cover $b$ is provided with an upstanding sleeve $g$, the interior of which is preferably tapered to closely fit a tapered conical cut-off valve $h$ equipped with an operating handle $j$. For a very important purpose, which will hereinafter be more fully discussed, the valve $h$ is provided with diametrically opposite upper and lower grooves $k$ and $m$ connected by an oblique port $n$. The sleeve $g$ is provided with outstanding nipples $p$ and $t$, which, as will hereinafter appear, afford air and milk ports, respectively.

The numeral 6 indicates a flexible air tube, and the numeral 7 a flexible milk tube, the delivery ends of which are connected, respectively, onto the nipples $p$ and $t$. The extended end of the tube 7 is connected to the receiving end of a coupling head in the form of a tube 8, the opposite end of which, as shown, is closed by a plug 9. At its intermediate portion, this coupling tube 8 is formed with a chamber 10, the annular upwardly projecting flange of which is seated with a tight joint against a bearing surface 11 and telescoped around a depending flange 12 on the under side of the central portion of a pulsator cylinder 13, the ends of which latter are closed by detachable heads 14.

In Fig. 1, there are shown teat cups of the character disclosed in my prior Patent No. 1,201,808, of October 17, 1916, and which teat cups are of the double chamber type provided with collapsible and expansible inner tubes 15 that form inner teat chambers 16 and surrounding air chambers 17 within the outer shells 18.

The coupling tube 8 is provided with four projecting milk tube nipples 19, located one pair on each side of the chamber 10. These four nipples 19 are connected independently by branch milk tubes 20, each to the inner chamber 16 of a cooperating teat cup.

The pulsator cylinder 13, at its under portion, is made thick and formed with longitudinally extended air conduits 21 that terminate in inner end ports 22 and outer end ports 23. The inner end ports 22 are located on opposite sides of a central port 24 and quite close thereto, while the ports 23 are located not far from the ends of the cylinder and, as shown, are adapted to be opened and closed to any desired extent by choke valves 25. The central port 24, as shown, is formed as an extension of the passage through a tubular clamping post 26, the upper end of which is screwed into the bottom of the cylinder and the lower end of which is extended through a perforation in the bottom of the coupling tube 8 and is provided with a thumb nut 27, which, when tightened, securely clamps the coupling tube 8 to the pulsator cylinder. It may now be noted that the extended end of the air tube 6 is connected onto the projected end of the tubular post 26 and, hence, is in constant communication with the port 24.

The pulsator cylinder 13, at its under side, is provided with four air tube nipples 36 projecting from opposite sides thereof and located in pairs on opposite sides of the central group of ports 22 and 24. These air tube nipples 36 are connected, two to the right-hand air conduit 21 and two to the left-hand air conduit 21, and these air tube nipples 36 are independently connected by flexible air tubes 37 to air tube nipples 38 applied to the outer shells 18 of the respective teat cups and in communication with the outer air chambers 17 thereof.

Working within the pulsator cylinder 13 is a double-ended piston, the heads 39 of which are connected by an axial piston stem 40; and loosely surrounding this stem 40 is an annular valve 41 that closely fits the cylinder 13. This valve 41, at its under side, has a port 42, which, under reciprocatory movements of said valve, will alternately connect the central air port 24, first to the right-hand port 22 and then to the left-hand port 22. In practice, the central portion of the cylinder 13 will be constantly subject to atmospheric pressure and said valve 41 is so formed that it will connect the left-hand port 22 to the atmosphere when the port 42 connects the right-hand port 22 to the central or suction port 24 and, conversely, will connect the right-hand port 22 to the atmosphere when said port 42 connects the left-hand port 22 to said central or suction port 24. By means best shown in my above identified prior application, the valve 41 is held against rotation and limited in the extent of its oscillatory movement. The numeral 44 indicates long studs applied to the ends of the piston stem 40 and engageable with the cylinder heads 14 to limit the reciprocating movements of the piston heads.

The central portion of the valve stem 40 is shown as formed with diametrically projecting bosses 45 and with an axial passage connecting the same, and in these bosses are mounted ball bearing plungers 46 between which is compressed a coiled spring 47. The plungers 46 are formed with pockets that carry hardened balls 48 that work against the reversely flaring conical inner surface of the valve 41.

All of the elements above indicated by numerals, except the numerals 6, 7 and 26, are identical with elements indicated by corresponding numerals in the said prior application, and the operation of the pulsating mechanism proper is fully described in said prior application For the purposes of this case, it is only desirable to state that, under partial vacuum maintained in the milk pail $a$, when the valve $h$ is opened, as shown in Fig. 1, the pulsator piston will be reciprocated, thereby producing intermittent pulsations in the teat cups, which will draw milk from the teat cups through the branch milk tubes 6 into the coupling tube 8 and thence through the milk tube 7 and valve $h$, into the milk can. In the particular milking apparatus illustrated in the said prior application, the suction or partial vacuum necessary to operate the pulsator was rendered effective in the pulsator, by air drawn through the milk tube, and this partial vacuum was rendered effective by connecting the ports 21 to the chamber 10 of the coupling tube 8. In the structure illustrated in said prior application, there was but the single combined air and milk tube for connecting the pulsator to the milk can, and the air taken in in the operation of the pulsator was drawn in with the milk through the single combined tube. That arrangement had this very desirable action, that, while the milk was flowing freely from the cow and the combined air and milk tube was well filled with milk, the air flow would be choked down so that the pulsator would make relatively slow and long continued strokes, such as required in the normal or full milking action, but when the cow was nearly milked out and the flow of milk became slow, the air flow would be freer and the pulsator would then make relatively short and rapid reciprocation, thereby producing just the kind of teat cup action required for what is known as "stripping".

The said single tube or combined milk and air tube connection between the pulsator and the milk pail, however, had this defect, that milk was liable to work its way up into the pulsator mechanism and interfere with its operation. To prevent this, there was provided in the structure illustrated in the said prior application a check valve mechanism, which, in part, cured the defect just noted.

In further practice, I have found, however, that a much more satisfactory milking apparatus could be made by providing independent milk and air tubes for connecting the milk can to the coupling tube and pulsator; but I also found in my first experiments that this double tube arrangement was defective in this, that it did not have the above noted very desirable "stripping" action. This failure in the desired stripping action was quite apparently due to the fact that accumulation of milk in the milk tube did not in any way choke or restrict the flow of air in the air tube connection between the can and pulsator I then made this discovery, which is the gist of the present invention, to wit: that, in the double tube, that is, the independent milk and air tube system, the accelerated short stroke action desired for "stripping", when the flow of milk has slowed down, may be produced by causing the air and the milk delivered to the can from the teat cups and pulsator, respectively, to flow through a common cavity or passage, herein designated broadly as a "trap". This trap, as I have now thoroughly demonstrated in practice, when well filled with milk, will obstruct the flow of air, so that the movements of the pulsator piston will be long and slow, and when the said trap is only partly filled with milk and the flow of air is thus less restricted or obstructed, the movement of the pulsator piston will speed up, thereby producing the rapid and less intense milk-drawing pulsations in the teat cups, which is so desirable for the stripping.

In the preferred embodiment of my invention, the trap above described is formed in the cut-off valve $h$ and, as illustrated in the drawings, the said trap is afforded by the grooves $k$ and connecting passage $n$. By reference to Fig. 1, it will be noted that the lower portion of the trap formed by the groove $k$ and passage $n$ will be kept filled with milk when the flow of milk is free and, in fact, the groove $k$ will then be kept filled with milk up to the nipple $t$. When, however, the flow of milk slows down, more or less of the milk will be sucked out of the trap, thereby giving a freer flow of air through the groove $k$, nipple $p$, and other connections to the pulsator. Of course, when the valve $h$ is rotated so as to carry the groove $k$ out of communication with the nipples $p$ and $t$, the pulsating action will be entirely stopped, said valve, therefore, affording the double function of cut-off valve and trap.

In the modified construction illustrated in Fig. 5, the valve $h'$ is mounted in a sleeve $a'$ on top of a cover $b'$, and said sleeve and cover are formed with a block-like portion $g^2$, in which is formed a U-shaped trap $k'$ connected to an air nipple $p'$ and milk nipple $t'$. In this arrangement, the valve $h'$ is provided with a groove $h^2$, which, when turned into communication with the trap $k$, starts the pulsator into action.

In what is at present believed to be the preferred form of the invention, the pulsator is applied to or closely connected with the coupling head at the free ends of the two flexible tubes, but broadly considered, the invention consists in any arrangement wherein a plurality of flexible tubes, such as a milk tube and an air tube, are extended from the milk receptacle to the teat cup connection, wherein the pulsator at the one or other end of the flexible air tube is arranged to produce pressure pulsations in the teat cup connection, and wherein the air and milk drawn through the respective tubes are caused to pass through a trap located on the cover or otherwise closely associated with the milk receptacle. Particularly, this combination or arrangement is designed for use in connection with double-chambered teat cups, these teat cups having both milk and air chambers separated by a flexible diaphragm or element.

What I claim is:

1. A milk receptacle having an associated trap in which partial vacuum is maintained and through which milk and air are adapted to be delievered into said receptacle, flexible milk and air tubes extended from said trap, a coupling head connected to the extended end of said milk tube and having teat cup connections, and a suction-actuated pulsator associated with said coupling head and connected to the extended end of said air tube.

2. The combination with a milk receptacle in which partial vacuum is adapted to be maintained, of a trap associated with said milk receptacle, a coupling head having teat cup connections, a vacuum-actuated pulsator associated with said coupling head for producing pulsations in the teat cup connections, a milk tube, the extended end of which is connected to said coupling head, and an air tube, the extended end of which is connected to said pulsator, the delivery ends of said milk and air tubes being connected to said trap for the delivery of air and milk into said can through said trap for the purposes stated.

3. The structure defined in claim 1 in which said milk receptacle is provided with a detachable cover and in which said trap is applied to said cover, and a valve applied to said cover and operative to simultaneously connect said milk and air tubes to said milk receptacle and to simultaneously cut off communication between said two tubes and milk receptacle.

4. The structure defined in claim 1 in which said pulsator has a tubular air-conducting stem extended through said coupling tube and in which the extended end of said milk tube is connected to the extended end of said stem.

5. The combination with a milk receptacle in which partial vacuum is adapted to be maintained, of a valve seat leading to the interior of said milk receptacle, milk and air tubes leading from said valve seat, a coupling head connected to the extended end of said milk tube and having teat cup connections, a vacuum-actuated pulsator associated with said coupling head for producing pulsations in said teat cup connections, said pulsator having an air port connected to the extended end of said air tube, and within the valve seat of said milk receptacle a cut-off valve formed with a passage affording a trap through which milk and air, respectively, from said milk and air tubes will pass on their way to said milk receptacle, when said valve is turned to a port-opening position.

In testimony whereof I affix my signature.

LAURITS DINESEN.